W. H. KELLER.
VACUUM CLEANER.
APPLICATION FILED FEB. 5, 1909.
1,143,833.
Patented June 22, 1915.
2 SHEETS—SHEET 2.
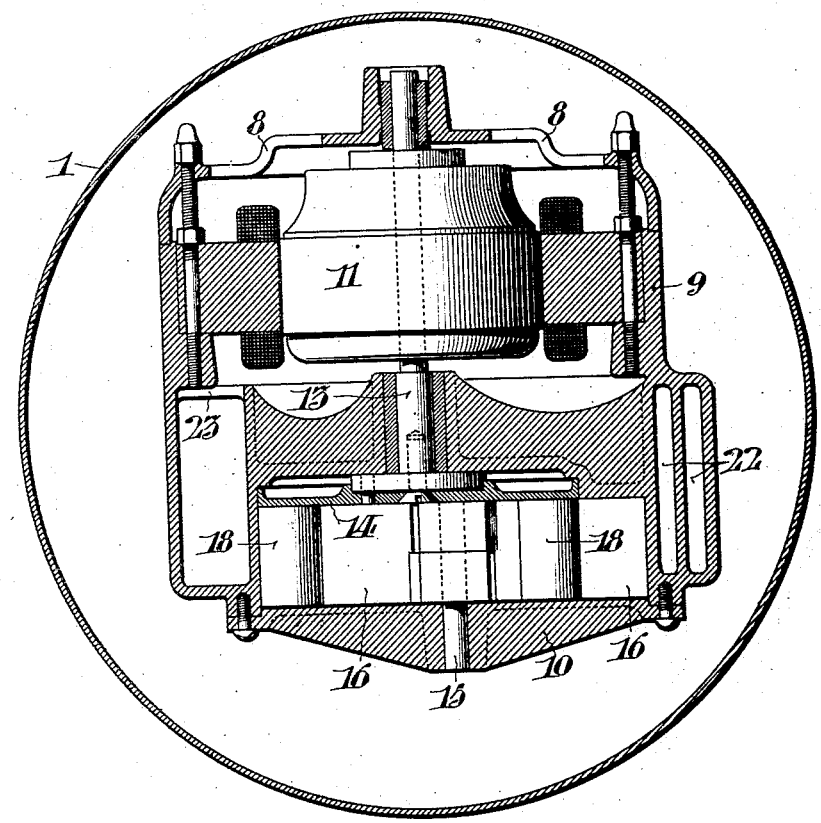
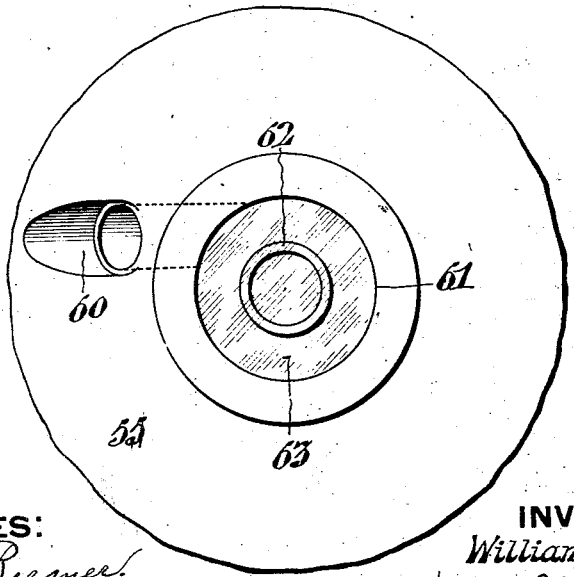
WITNESSES:
INVENTOR:
William H. Keller,

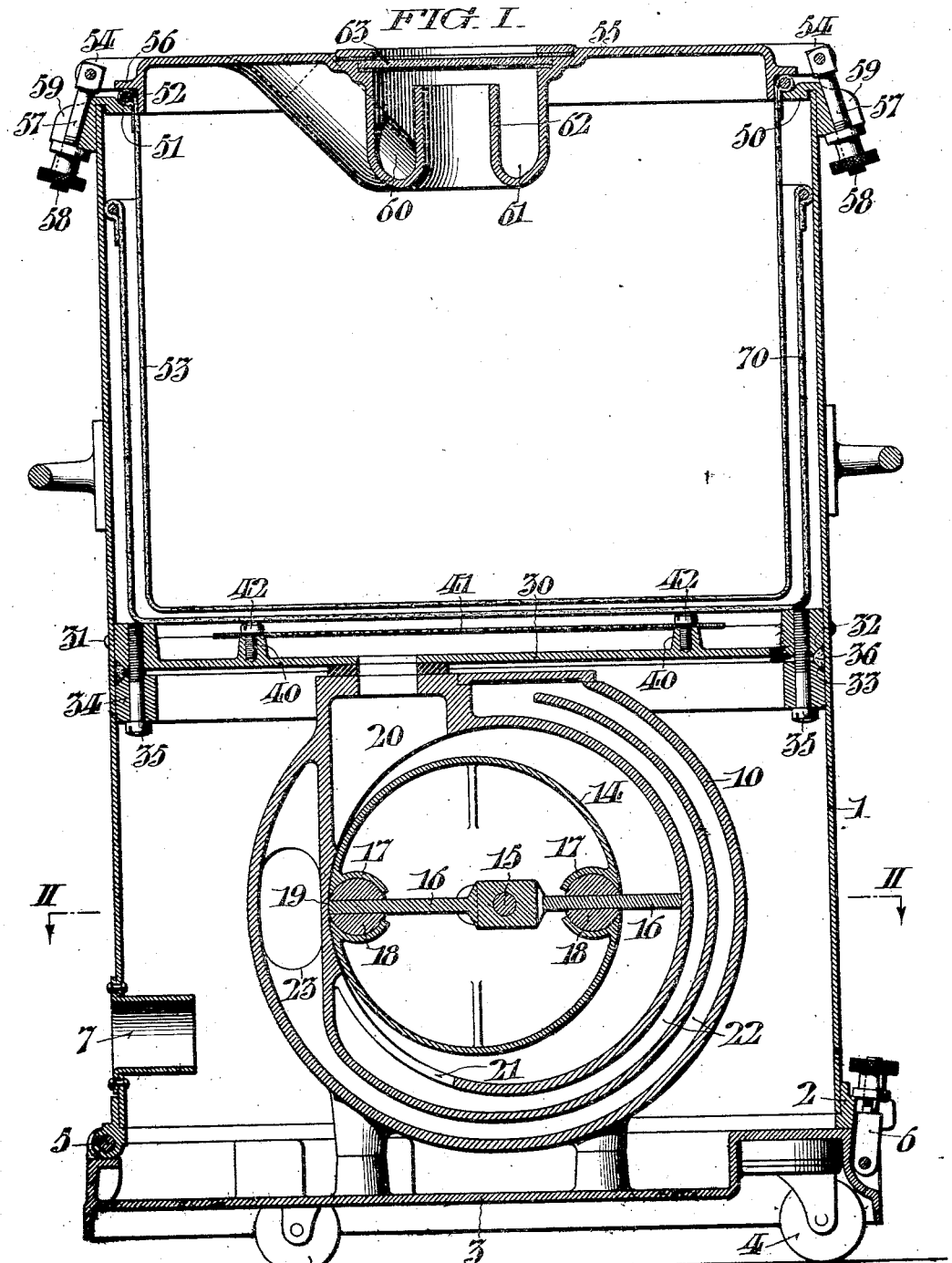

UNITED STATES PATENT OFFICE.

WILLIAM H. KELLER, OF PHILADELPHIA, PENNSYLVANIA, ASSIGNOR, BY MESNE ASSIGNMENTS, TO SANTO MANUFACTURING COMPANY, OF PHILADELPHIA, PENNSYLVANIA, A CORPORATION OF DELAWARE.

VACUUM-CLEANER.

1,143,833. Specification of Letters Patent. Patented June 22, 1915.

Application filed February 5, 1909. Serial No. 476,685.

*To all whom it may concern:*

Be it known that I, WILLIAM H. KELLER, of Philadelphia, in the county of Philadelphia and State of Pennsylvania, have invented certain new and useful Improvements in Vacuum-Cleaners, whereof the following is a specification, reference being had to the accompanying drawings.

My invention has for its object the creation of steady continuous powerful suction in a vacuum cleaner, as well as the production of a compact and portable apparatus with a maximum capacity in a minimum space.

In vacuum cleaners it has hitherto been customary to employ suction produced by either reciprocating pumps or bellows. This is objectionable because the intermittent or pulsating character of the suction produced, tends to prevent the perfect operation of the air filtering layer, the pulsation at its moment of highest tension tending to draw dust through the filtering material which should be retained. It is also objectionable as requiring an equalization chamber to surround the filter in order to distribute the suctional strain as evenly as possible.

My invention therefore relates to the combination with the filtering chamber of a vacuum cleaner, of means for producing continuous and steady suction thereupon. The ordinary fan blower does not create suction of sufficient power to serve this purpose, but I have discovered that by the employment of a rotary pump of the type hereinafter described, the requisite continuous and steady suction can be obtained imparting to my apparatus the highest degree of efficiency. In my apparatus, I am able to connect the suction pump directly to the filtering chamber without the interposition for the purpose of equalizing the suction, of any considerable body of air between the two. The pump being a rotary one, I am able to mount it co-axially with an electric motor thus economizing space, so that the entire apparatus becomes an exceedingly compact and therefore readily portable one.

In the accompanying drawings, Figure I, is a vertical central section of an apparatus embodying my invention. Fig. II, is a horizontal section along the line II, II, in Fig. I. Fig. III, is a partial plan view of the cover.

My apparatus as shown, is cylindrical in type, being contained within a cylindrical casing 1, the lower rim 2, of which rests upon a base plate 3, which may be conveniently mounted upon rollers 4. In order to facilitate access to the interior of the lower part of the cylinder, the lower rim of the casing is at one side connected to the base 3, by a hinge 5, and secured on the opposite side by a swivel bolt 6. The lower part of the casing is further provided with an exhaust aperture 7.

Within the lower part of the casing there is mounted upon the base plate, a rotary suction pump 10, and an electric motor 11. The construction of the motor need not be here described, as it may be of any standard type. The case 9, of the motor is integral with the case of the rotary pump, making an exceedingly strong and compact construction.

The shaft 13, of the motor is in axial connection with the projecting end of a rotary drum 14, mounted eccentrically within the rotary pump. Within the cylindrical body of the pump is an axial shaft 15, upon which are pivoted the veins or blades 16, two in number, as shown, but of which any convenient number may be used. Where the blades pass through the eccentric drum, the latter is provided with slotted sockets 17, which inclose split rocking pins 18. The eccentric drum is in contact with the inner edge of the cylindrical body of the pump, at one point 19, and on opposite sides of this point are the ports 20, and 21, the former being the suction port and the latter the exhaust port. The pump is surrounded by a muffler, containing a circuitous passage 22, which connects the exhaust port with the exhaust aperture 23, by which the air is blown through the motor and thence through openings 8, in the motor case in the lower part of the casing 1, whence it escapes by the aperture 7.

Immediately above the motor and pump the casing is divided by a horizontal partition 30, which is secured thereto by means of rivets 31. The said partition 30, is provided with a peripheral bevel 32, which coacts with a similar bevel 33, on the ring 34, to clamp by means of screws 35, the packing 36, whereby the vacuum chamber is rendered air-tight at this region. The partition 30, is also provided with lugs 40, which support a perforated plate 41, secured by means of screws 42. The function of said plate is to prevent the filtering bags from being drawn over the exhaust port 20, of the pump 10.

The casing 1, terminates at its top in a rim 50, having an internally extending peripheral flange 51, which acts as a seat for the packing ring 52, forming the edge of the filtering bag 53. The cover plate 55, is also provided with a peripheral flange 56, which is forced against the ring 52, whereby the vacuum chamber is rendered air-tight at the top. This is accomplished by means of the swivel bolts 57, which are pivoted in lugs 54, formed on the cover 55, and are provided with thumb screws 58, which are tightened against abutting lugs 59, cast integral with the rim 50.

The dust laden air is drawn into the apparatus through a downwardly inclined passage 60, which enters into a circular observation chamber 61, formed at the center of the coverplate 55. A cylindrical vertical baffle tube 62, extends from the bottom of the said chamber 61, nearly to the top and terminates directly under the sight glass 63, which forms its cover. The air is drawn against the bottom of the chamber 61, by virtue of the incline of the passage 60, and after entering is whirled about the axial cylinder 62, gradually rising therein, and is finally drawn over its upper edge into the filtering bag 53. By this arrangement observations may be made from time to time through the sight glass 63, to ascertain the condition of the air as it is received into the apparatus.

A second filtering bag 70, is suspended within the vacuum chamber, between the first filter bag 53, and the perforated plate 41. This second bag 70, is provided to insure perfect filtration of finer dust escaping through the bag 53, so that the air is entirely free from dust before being exhausted through the pump 10.

The bag 53, which is the primary filtering means, may be made of canvas, of sufficient strength and of a sufficiently fine texture to retain the dust. The second bag 70, may be made of felt, which, having a finer texture than the canvas, completely purifies the air from any dust which may have found its way through the interstices of the canvas.

It will be observed that the connection between the suction pump and the filtering chamber is a direct one, so that no space is wasted in providing, as has heretofore been customary, a considerable air chamber to surround the filtering surface. In this way practically the entire space within the filtering chamber may be used for the storage of dust. This is rendered possible by the continuous and steady nature of the suction produced by the particular kind of rotary pump which I employ in my apparatus. I do not in the present application claim the construction of this pump considered by itself, as it forms the subject matter of another application filed by me under date of January 16th, 1909, Serial Number 472,571, but the claims of the present application are specifically directed to the employment of a pump of this general character in connection with vacuum cleaner apparatus as described. I find a further advantage in the use of a rotary suction pump, such as I have described, in my vacuum cleaner, in the greater cleansing efficiency of the apparatus, due to the steady suction produced. In cleaning a carpet with a cleaner employing a reciprocating pump, ridges are often observed on the cleaned surface, due to the intermittent character of the suction. This is avoided by the steady yet powerful suction produced by my pump.

I disclaim, as not being of my invention, the following subject matter: In a cleaning machine, the combination of a chamber provided with inlet and outlet ports or openings, depending receptacles having permeable walls arranged in the chamber, one within but separated from the other, the receptacles being so arranged that the inlet port will discharge into the inner receptacle, said outer receptacle being adapted to be maintained separated from said inner receptacle by the flow of air through said ports.

And I also disclaim, as not being of my invention, the following subject matter: In a cleaning machine, the combination of a chamber provided with inlet and outlet ports or openings, depending receptacles having permeable walls arranged in the chamber, one within but separated from the other, the receptacles being so arranged that the inlet port will discharge into the inner receptacle, and means for maintaining a practically uniform flow of air through the chamber and receptacle.

I also disclaim as not being of my invention, the following subject matter: In a device of the character stated, a casing having a vacuum chamber provided with an inlet and an outlet, a flexible dust separator device therein, a supporting ring detachable from said casing for the upper portion of said separating device, the latter depending from said ring, and means for supporting the same at the bottom against movement toward the outlet.

I also disclaim as not being of my invention, the following subject matter: In a device of the character stated, a casing having a vacuum chamber provided with an inlet and an outlet, means for withdrawing fluid through the outlet to create the vacuum, a flexible dust-separating device therein, a supporting ring detachable from said casing for the upper portion of said separating device, the latter depending from said ring, and a support for the lower end of said device extending transversely thereunder.

I also disclaim as not being of my invention, the following subject matter: In a device of the character described, a casing having a vacuum chamber provided with an inlet and an outlet, a cover for said casing, a dust bag support clamped between said cover and said casing, a filtering dust bag carried by said support and extending into said vacuum chamber, an outer filtering dust bag surrounding the lower portion of said first mentioned bag, means independent of the support of said first mentioned bag for maintaining said outer bag in position with relation thereto, and means communicating with the outlet of said vacuum chamber for maintaining a vacuum in said chamber.

Having thus described my invention, I claim:—

1. A portable vacuum cleaner comprising a supporting base, a cylindrical outer casing mounted on said base with its axis vertical, means for detachably connecting said casing to said base, a single partition extending across said casing intermediate its ends, said partition fitting the inner face of said casing, means for securing the partition to said casing, means coöperating with said partition for forming an air tight joint between the partition and the casing, a filtering material arranged in the casing above said partition, means for closing the top of the casing, said closing means having an inlet opening, said partition having an opening formed therethrough and vacuum creating means located in the casing below the partition and connected to said opening formed through said partition.

2. A portable vacuum cleaner comprising a supporting base, a cylindrical outer casing mounted on said base with its axis vertical, means for detachably connecting said casing to said base, a single partition extending across said casing intermediate its ends, said partition fitting the inner face of said casing, means for securing the partition to said casing, the lower edge of said partition having a beveled portion, a ring, means for clamping said ring to said partition, said ring having a beveled portion facing the beveled portion on said partition, a packing adapted to be engaged by said beveled portions and forced against the outer casing for making an air tight joint between the partition and the casing, a filtering material arranged in the casing above said partition, means for closing the top of the casing, said closing means having an inlet opening, said partition having an opening formed therethrough, and vacuum creating means located in the casing below said partition and having an inlet opening registering with the opening in said partition.

In testimony whereof, I have hereunto signed my name, at Philadelphia, Pennsylvania, this third day of February, 1909.

WILLIAM H. KELLER.

Witnesses:
JAMES H. BELL,
E. L. FULLERTON.